United States Patent [19]

Spector

[11] Patent Number: 6,112,328
[45] Date of Patent: Sep. 5, 2000

[54] WATER-RESISTANT OUTERWEAR

[76] Inventor: Donald Spector, 380 Mountain Rd., Union City, N.J. 07080

[21] Appl. No.: 09/062,698

[22] Filed: Apr. 20, 1998

[51] Int. Cl.⁷ .............................. A41D 11/00; A41D 1/00; B32B 5/18
[52] U.S. Cl. .............................. 2/69; 2/97; 2/81; 442/221; 442/238
[58] Field of Search .............................. 2/97, 87, 93, 69, 2/79, 81, 227; 428/224, 102, 96, 109; 5/448; 442/60, 221, 238, 260, 301; 28/100; A41D 11/00, 1/00; B32B 5/18, 15/14

[56] References Cited

U.S. PATENT DOCUMENTS

| | | | |
|---|---|---|---|
| 4,569,874 | 2/1986 | Kuznetz | 428/109 |
| 4,716,598 | 1/1988 | Bertram | 2/108 |
| 4,739,522 | 4/1988 | Lassiter et al. | 2/69 |
| 5,002,014 | 3/1991 | Albin | 119/1 |
| 5,104,725 | 4/1992 | Broaddus | 428/224 |
| 5,267,519 | 12/1993 | Uglene et al. | 112/440 |
| 5,268,212 | 12/1993 | Lumb et al. | 428/96 |

*Primary Examiner*—John J. Calvert
*Assistant Examiner*—Robert H. Muromoto, Jr.

[57] ABSTRACT

A light-weight fabric for producing outerwear garments suitable for wear on boats, beaches and in other environments in which the wearer may be exposed to rain or water, as well as to cold temperature. The fabric is composed of inner and outer skins formed of woven synthetic plastic fibers, such as nylon, which render the skins water-resistant, yet permeable to vapor whereby the fabric is breathable. Sandwiched between the skins is a layer of polyester fiberfill which imparts thermal insulation-characteristics to the fabric. Dispersed throughout the fiberfill and imprisoned therein are fine, closed-cell foam plastic beads which impart buoyancy and quick-dry properties to the fabric.

5 Claims, 1 Drawing Sheet

WATER-RESISTANT OUTERWEAR

BACKGROUND OF THE INVENTION

1. Field of Invention

This invention relates generally to a fabric for producing outerwear garments suitable for wear in outdoor environments exposing the wearer to water as well as to cold temperatures, and more particularly to a light-weight thermally-insulated fabric of this type which is water-resistant, buoyant and quick-drying.

2. Status of Prior Art

On boats, beaches, hiking trails and in other outdoor environments in which a wearer of an outerwear garment is exposed to rain or water as well as to cold temperatures, the garment should be capable of coping with all aspects of this environment.

A suitable outerwear garment for cold climates is a field jacket having an outer shell of waterproof fabric, such as a sheet of woven nylon laminated to a plastic film, and an inner liner of thermal insulation material, such as wool padding. A field jacket of this type is relatively heavy, but that is not its only drawback. The waterproof shell of the jacket is not permeable to vapor. Hence should the wearer be engaged in strenuous activity causing him to sweat, the resultant vapor from the body of the wearer will not be released from the jacket and its wearer will become clammy and uncomfortable.

And should the wearer of this jacket be on a boat and fall overboard, the jacket then offers the wearer no protection, for the wool liner will become saturated with water and weigh the wearer down rather than providing buoyancy to keep the wearer afloat.

Also when the wool liner becomes saturated with water and one then squeezes out the water in order to dry out the jacket, the jacket is then very slow to dry out, for residual moisture retained by the wool after the water is squeezed out, is entrapped in the interstices of the tangled wool fibers.

An outerwear garment adapted to keep a wearer warm requires thermal insulation. The reason a wool sweater or a cotton sweatshirt provides warmth is that the natural fibers of these garments having myriad still air pockets dispersed throughout the fabric. Heat flows from a site of higher temperature to one of lower temperature mainly by conduction through a solid and by convection, that is, by the flow of a fluid carrying heat. The conductance of natural fibers is low and the still air pockets therein greatly reduce convection.

But the properties of fabrics made of natural fibers which result in good thermal insulation also give these fabrics slow drying characteristics. When a wet wool garment, such as a swim suit is squeezed to expel water therefrom, the residual moisture entrapped in the interstices of the wool is very slow to evaporate.

With outerwear garments intended for wear on boats and in other environments in which the wearer runs the risk of falling into the sea, one must take into account whether the garment offers the wearer any protection in this situation. Should the wearer who falls into the sea be wearing a heavy overcoat, the overcoat will become saturated with water and lack buoyancy. This also applies to conventional sweatshirts and field jackets worn by the wearer.

Of prior art interest are life preservers made of kapok. Kapok is a silky fiber that surrounds the seeds of a kapok tree. A significant feature of a fabric in accordance with the invention is that its buoyancy approaches that of kapok, yet can be tailored to create an outerwear garment of any desired type.

SUMMARY OF INVENTION

In view of the foregoing, the main object of this invention is to provide a fabric for producing outerwear garments suitable for wear on boats, beaches, ski resorts and in other environments in which the wearer may be exposed to rain or water, as well as to cold temperatures.

Among the significant advantages of a fabric in accordance with the invention are the following:

A. An outerwear garment made from the fabric is light weight and comfortable.

B. The garment is water-resistant, yet breathable; hence vapor emanating from the body of the wearer is released by the garment.

C. Despite its light weight, the garment provides highly effective thermal insulation.

D. The garment, when saturated with water, can be squeezed to expel the water and then quickly dry out.

E. The garment is buoyant and therefore effectively acts as a life preserver to keep its wearer afloat in water.

Also an object of the invention is to provide a fabric made entirely of synthetic plastic material which can be produced at relatively low cost.

Briefly stated, these objects are attained in a lightweight fabric for producing outerwear garments suitable for wear on boats, beaches and in other environments in which the wearer may be exposed to rain or water as well as to cold temperature. The fabric is composed of inner and outer skins formed of woven synthetic plastic fibers, such as nylon, which render the skins water-resistant, yet permeable to vapor whereby the fabric is breathable.

Sandwiched between the skins is a layer of polyester fiberfill which imparts thermal insulation-characteristics to the fabric. Dispersed throughout the fiberfill and imprisoned therein are fine, closed-cell foam plastic beads which impart buoyancy and quick-dry properties to the fabric.

BRIEF DESCRIPTION OF DRAWING

For a better understanding of the invention as well as other objects and further features thereof, reference is made to the following detailed description to be read in conjunction with the accompanying drawings, wherein.

DESCRIPTION OF INVENTION

Figure 1:
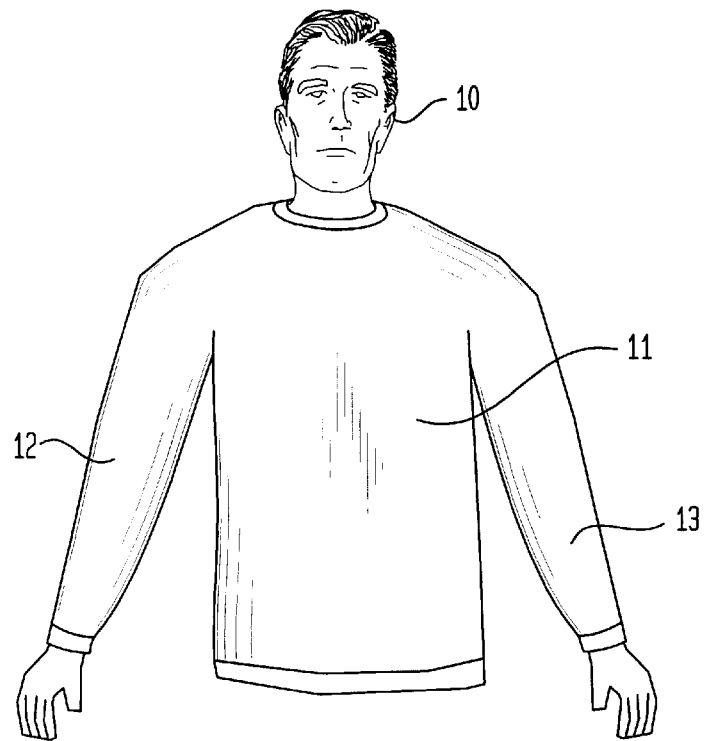
FIG. 1 shows a garment formed from a fabric in accordance with the invention, the garment being in the form of a sweatshirt.

Referring now to FIG. 1, there is shown an individual 10 wearing a garment 11 fashioned of fabric in accordance with the invention. Garment 10 is a sweatshirt having a pair of sleeves 12 and 13 extending from the shoulders of the shirt.

It is to be understood that fabric in accordance with the invention can be used to form any type of outerwear, and that the sweatshirt shown is merely by way of example. Thus the same fabric can be used to produce a field jacket, a T-shirt or a coat.

Figure 2:
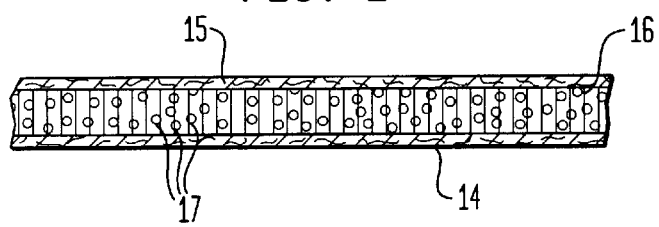
FIG. 2 is a section taken through the fabric.

The fabric from which the garment is made includes, as shown in FIG. 2, an inner skin 14 and an outer skin 15. These skins are made of tightly-woven sheeting of synthetic plastic fibers of high-strength, such as nylon or polyethylene. The tight weave of the skin which is preferably a microweave is such as to render the skin water-resistant, but vapor permeable. When the garment is worn in the rain, the rain will not penetrate the fabric, but vapor generated by the wearer of the garment will pass through the fabric and be discharged into the atmosphere. Thus should the wearer of the garment perspire, the resultant vapor will be released into the atmosphere and will not condense on the body of the wearer and make it clammy and uncomfortable.

Sandwiched between skins 14 and 15 is a layer of polyester fiberfill 16, a light-weight, low-density cluster of silky synthetic fibers of the type commonly used as thermal insulation in comforters. The fiberfill is characterized by myriad pockets of still air which are resistant to convection currents. However, the polyester fibers of fiberfill are non-absorbent, and should the fiberfill become saturated with water due to immersion of the fabric, and the fabric is then squeezed to expel the water, the moisture that remains in the fiberfill is not absorbed thereby but is quickly evaporated.

Uniformly dispersed throughout the fiberfill are fine beads 17 of closed-cell foam plastic material, such as styrofoam or polyurethane. Because the closed cells of these beads are air filled, the beads do not absorb water, but float on water.

Figure 3:
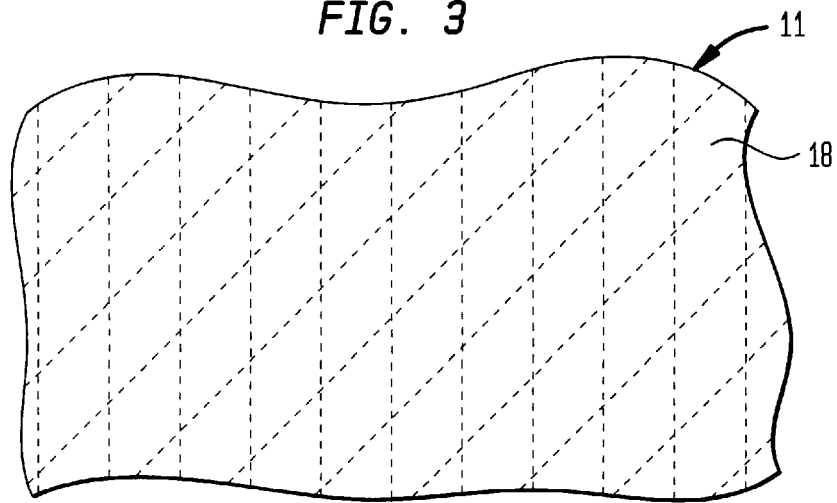
FIG. 3 is a plan view of the fabric showing the quilting thereof.

As shown in FIG. 3, the fabric is quilted by means of criss-cross sewing 18 with nylon threads. This quilting effectively divides the fabric into an array of separate diamond-shaped compartments, each having a charge of beads 16 confined therein. Because of the quilting, beads from one compartment cannot migrate into an adjacent compartment and the beads therefore remain distributed throughout the fabric regardless of how the garment is handled.

The light-weight fabric because of the cushioning characteristics of the fiberfill layer sandwiched between the skins is soft and compressible. And the sandwich also acts as thermal insulation to protect the wearer of the garment from cold temperatures. While the fabric sandwich may be somewhat thicker than a standard raincoat, it is not only rain-resistant, but unlike most raincoats, it is breathable, for vapors are free to pass through both skins and the fiberfill layer interposed therebetween.

And because of the low-density, closed-cell beads dispersed throughout the fiberfill, the fabric has buoyancy characteristics similar to that of which imparts to the garment the properties of a kapok life preserver. Thus if the wearer of the sweatshirt falls overboard, the sweatshirt has sufficient buoyancy to keep the wearer afloat even though the water penetrates the skins of the fabric.

And when the interior of the fabric becomes saturated with water, it is a simple matter to squeeze the water out of the fabric and then permit the fabric to dry out. This dry out operation takes place quickly, for the residual moisture which remains after the water is squeezed out, is not absorbed by the fiberfill or by the beads dispersed therein, but is quickly evaporated.

While there has been shown a preferred embodiment of fabric in accordance with the invention, it is to be appreciated that many changes may be made therein without departing from the spirit of the invention.

I claim:

1. A light-weight fabric from which can be made a thermally-insulated and water-resistant garment, said fabric comprising:

A. inner and outer skins formed of water-resistant sheeting made of synthetic plastic fibers permeable to vapor;

B. a layer of fiberfill sandwiched between the skins to provide thermal insulation; and C. a plurality of fine beads dispersed throughout the fiberfill, said beads being formed of low-density, closed-cell foam plastic material which imparts a high degree of buoyancy to the fabric whereby the garment made from the fabric acts as a life preserver should the wearer of the garment fall into water.

2. A fabric as set forth in claim 1, in which the fibers are nylon.

3. A fabric as set forth in claim 1, in which the fiberfill is formed of polyester fibers.

4. A fabric as set forth in claim 1, in which the beads are formed of styrofoam.

5. A fabric as set forth in claim 1, in which the fabric is quilted by criss-cross sewing to define compartments, each occupied by a charge of said beads.

\* \* \* \* \*